(12) United States Patent
Clemen, Jr. et al.

(10) Patent No.: US 9,835,914 B2
(45) Date of Patent: Dec. 5, 2017

(54) WINDOW METHOD AND APPARATUS FOR PROTECTION FROM BRIGHT LIGHT SOURCES

(71) Applicant: The Boeing Company, Chicago, IL (US)

(72) Inventors: Mark J. Clemen, Jr., Southworth, WA (US); John R. Hull, Sammamish, WA (US); Philip E. Johnson, Auburn, WA (US); Rick L. McGann, Kent, WA (US); George A. Perry, Federal Way, WA (US); Alan F. Stewart, Seattle, WA (US); Mark S. Wilenski, Mercer Island, WA (US); Donald V. Drouin, Jr., O'Fallon, IL (US); Le Li, Hopewell Junction, NY (US); Yongxin Tang, Poughkeepsie, NY (US); Haiping Yu, Hopewell Junction, NY (US); Jiangbin Zhao, Fishkill, NY (US); Jie Yang, Fishkill, NY (US); Shenggang Wang, Fishkill, NY (US)

(73) Assignee: The Boeing Company, Chicago, IL (US)

( * ) Notice: Subject to any disclaimer, the term of this patent is extended or adjusted under 35 U.S.C. 154(b) by 111 days.

(21) Appl. No.: 15/056,415

(22) Filed: Feb. 29, 2016

(65) Prior Publication Data

US 2017/0248811 A1    Aug. 31, 2017

(51) Int. Cl.
*G02F 1/1335* (2006.01)
*G02F 1/1347* (2006.01)
(Continued)

(52) U.S. Cl.
CPC .......... *G02F 1/1347* (2013.01); *B64C 1/1484* (2013.01); *B64D 45/00* (2013.01);
(Continued)

(58) Field of Classification Search
CPC .................................................... G02F 1/1347
(Continued)

(56) References Cited

U.S. PATENT DOCUMENTS

| | | |
|---|---|---|
| 4,978,182 A | 12/1990 | Tedesco |
| 5,831,769 A | 11/1998 | Smith |

(Continued)

*Primary Examiner* — Hoan C Nguyen
(74) *Attorney, Agent, or Firm* — Ostrager Chong Flaherty & Broitman P.C.

(57) ABSTRACT

According to an embodiment, an electrically switchable mirror includes: a first electrically switchable layer of cholesteric liquid crystal material, the first electrically switchable layer having a first state in which right-handed circularly polarized light incident thereon is reflected and left-handed circularly polarized light incident thereon is transmitted and a second state wherein right-handed and left-handed circularly polarized light incident thereon are transmitted; a second electrically switchable layer of cholesteric liquid crystal material, the second electrically switchable layer having a first state in which left-handed circularly polarized light incident thereon is reflected and right-handed circularly polarized light incident thereon is transmitted and a second state wherein right-handed and left-handed circularly polarized light incident thereon are transmitted; and a first electrically switchable wave plate disposed between the first and second electrically switchable layers.

21 Claims, 10 Drawing Sheets

(51) Int. Cl.
  *G02F 1/13363* (2006.01)
  *B64C 1/14* (2006.01)
  *B64D 45/00* (2006.01)

(52) U.S. Cl.
  CPC .............. *G02F 1/13363* (2013.01); *G02F 2001/13478* (2013.01); *G02F 2001/133638* (2013.01); *G02F 2203/05* (2013.01); *G02F 2203/07* (2013.01); *G02F 2203/09* (2013.01)

(58) Field of Classification Search
  USPC .................................................. 349/115–116
  See application file for complete search history.

(56) References Cited

U.S. PATENT DOCUMENTS

| | | | |
|---|---|---|---|
| 6,652,778 B1 | 11/2003 | Twarowski | |
| 7,202,852 B2 | 4/2007 | Harvie | |
| 7,344,260 B2 | 3/2008 | Derenski | |
| 9,285,646 B2 * | 3/2016 | Wang | G02F 1/13362 |
| 2003/0103713 A1 * | 6/2003 | Pan | G02B 6/3556 |
| | | | 385/16 |
| 2005/0007505 A1 * | 1/2005 | Faris | C09B 67/0098 |
| | | | 349/16 |
| 2014/0152944 A1 * | 6/2014 | Zhao | G02F 1/1347 |
| | | | 349/96 |

* cited by examiner

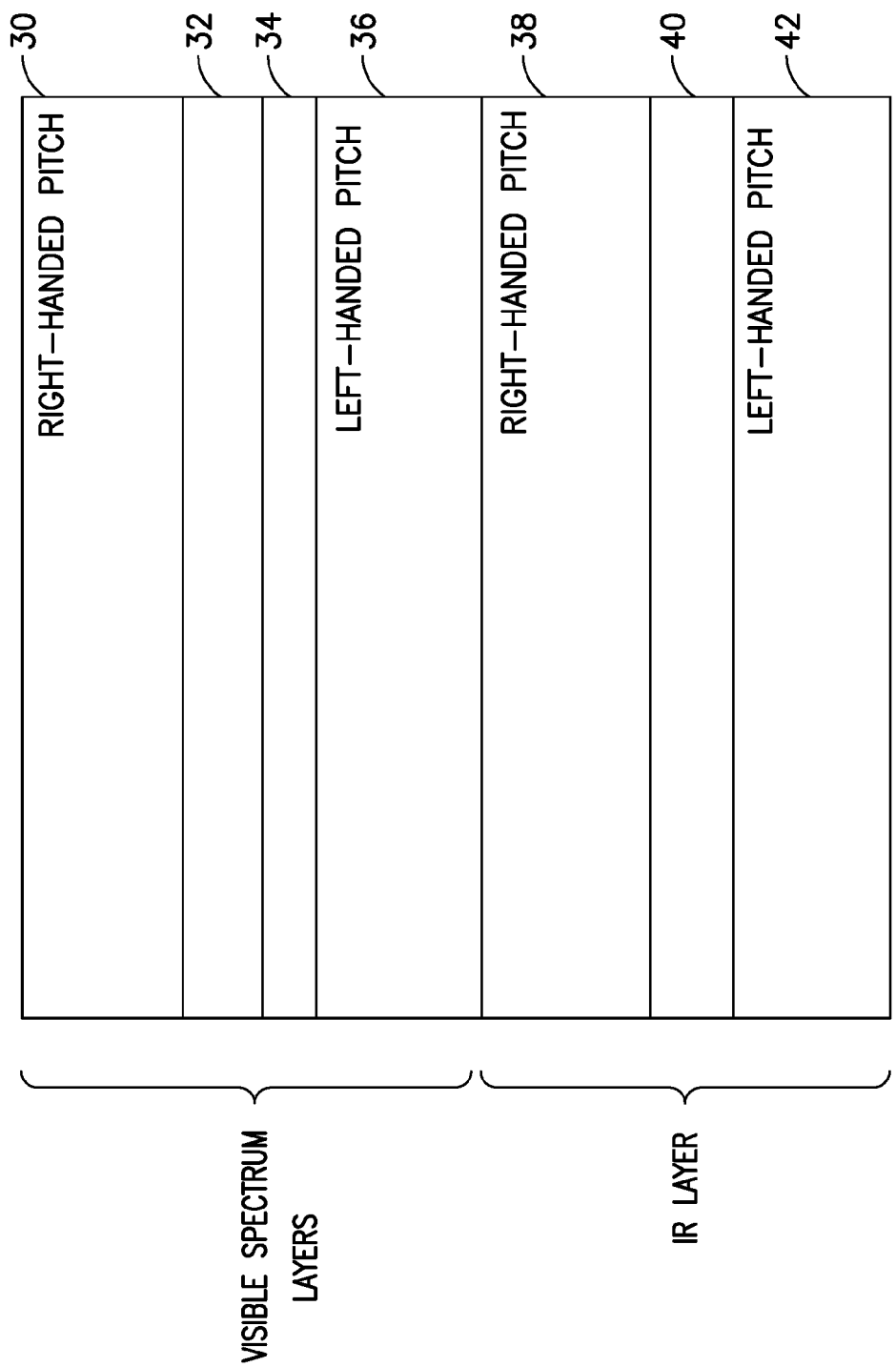

WINDOW METHOD AND APPARATUS FOR PROTECTION FROM BRIGHT LIGHT SOURCES

This invention was made with Government support under Contract No. TIA-W911W6-13-2-0011 awarded by the Department of Defense. The Government has certain rights in this invention.

BACKGROUND

This disclosure generally relates to systems and methods for the protection of vehicle crew members against existing and future high-intensity directed energy weapon threats such as laser and photonic weapons.

High-intensity light sources such as laser and other photonic weapon threats jeopardize crew members' vision as they operate vehicles in different operational scenarios. These emerging directed energy weapon threats span broad ranges in wavelength and intensity level, such as dazzler weapons and blinding weapons. Dazzler weapon threats include light sources that are near or below eye-damaging intensity but whose effectiveness lies in distracting the vehicle crew members from the timely execution of mission duties. Blinding weapons include high-intensity light source threats that are at or above eye-damaging intensity and may permanently damage crew members' eyes.

U.S. patent application Ser. No. 13/491,691, filed on Jun. 8, 2012 and entitled "High Intensity Light Source Blocking System and Method", discloses a high-intensity light source blocking system for an aircraft operated by a crew member within a crew member cockpit that includes an eye position detection system that outputs a crew member eye position relative to the crew member cockpit, a transparent dynamic-darkening display canopy covering the crew member cockpit, and a scene imager system having at least one scene imager either external to or within the crew member cockpit. The scene imager system is configured to detect a presence of a high-intensity light source and an emanation direction of the high-intensity light source relative to the crew member cockpit. A computing device is connected to the eye position detection system, the transparent dynamic-darkening display canopy and the scene imager system, and controls the darkening of a portion of the dynamic-darkening display canopy upon the occurrence of the high-intensity light source having an intensity value equal to or greater than a predetermined threshold or the crew member eye position being subject to a direct portion of the high-intensity light source. In accordance with one embodiment, the method comprises dynamically darkening an active window canopy of a crew member cockpit of an aircraft by detecting a high-intensity light source that impinges thereon. The entire active window canopy is darkened based on detecting the high-intensity light source and determines whether the high-intensity light source is above an intensity threshold. A direction of the high-intensity light source is determined relative to the active window canopy of the crew member cockpit. The active window canopy is then made transparent while darkening only a portion of the active window canopy at a location on the active window canopy based upon determining the direction of the high-intensity light source and determining a relative position of at least one crew member in the crew member cockpit.

There is a need for improvements in systems and methods that protect vehicle crew members' eyes from dazzler and blinding weapon threats that is responsive and allows crew members to maintain their operational duties within a vehicle.

SUMMARY

A system is proposed herein which provides active protection from eye exposure effects, permanent and temporary, caused by low-energy laser threats at arbitrary wavelengths transmitted by a canopy transparency. The system is failure-robust in the sense that it remains nearly 50% transmissive in a power fail mode. The system may also enable situational awareness by integrating an active display directly into the canopy. For the low-energy laser eye protection function, the system is literally a switchable mirror, minimizing disruption of aircrew line-of-sight by enforcing small mirrored "spots" on the canopy transparency to "shade" the aircrew eyes (corneas) from direct exposure to threat irradiation.

More specifically, the subject matter disclosed in detail below is directed in part to an electrically switchable mirror, implemented in at least pixel in a window or canopy, that is semi-transmissive (e.g., approximately 50%) in a power failure. The electrically switchable mirror is designed, when installed in a window or canopy, to protect a pilot from a dazzling or blinding light source of arbitrary wavelength by switching layers made of cholesteric liquid crystals from a transmissive state to a reflective state. In addition, when a power failure occurs, the window becomes semi-transparent. (In this disclosure, the terms "semi-transmissive" and "semi-transparent" are used synonymously.) To accomplish this, a half-wave retarder (also referred to herein as a "λ/2 plate" and "half-wave plate") is introduced. The λ/2 plate is switchable, i.e., when power fails, it introduces half-wave phase retardation; while with power on, it is switched into a homeotropic state so that no phase retardation occurs.

In accordance with some embodiments, an electro-optical switchable mirror device is provided which, under zero voltage (i.e., electrical power fail), exhibits a semi-transparent state having a transmittance close to 50% over a spectrum from 400 to 700 nm. When powered under a first drive scheme, the mirror is switched into a fully transparent state which has >80% transmittance over a 400 to 1100 nm spectrum range. On the other hand, if powered under a second drive scheme, the device is transitioned to a mirror state with an optical density of at least 1.3 or higher over the broad spectrum 400 to 1600 nm. These embodiments include a switchable λ/2 plate and a passive (non-switchable) phase compensator sandwiched between layers made of CLCs which are respectively tailored for left-handed and right-handed polarization as well as reflection wavelength and transmission quality. As used herein, the term "phase compensator" refers to a thin optical layer to improve the device opacity under larger viewing angles in the mirror state.

One aspect of the subject matter disclosed in detail below is an electrically switchable mirror comprising: a first electrically switchable layer of cholesteric liquid crystal material having a right-handed pitch; a second electrically switchable layer of cholesteric liquid crystal material having a left-handed pitch; an electrically switchable wave plate disposed between the first and second electrically switchable layers; and a phase compensator disposed between the first and second electrically switchable layers, wherein the electrically switchable mirror is semi-transmissive when the first and second electrically switchable layers and the electrically switchable wave plate are unbiased.

Another aspect of the subject matter disclosed in detail below is an electrically switchable mirror comprising: a first electrically switchable layer of cholesteric liquid crystal material, the first electrically switchable layer having a first state in which right-handed circularly polarized light incident thereon is reflected and left-handed circularly polarized light incident thereon is transmitted and a second state wherein right-handed and left-handed circularly polarized light incident thereon are transmitted; a second electrically switchable layer of cholesteric liquid crystal material, the second electrically switchable layer having a first state in which left-handed circularly polarized light incident thereon is reflected and right-handed circularly polarized light incident thereon is transmitted and a second state wherein right-handed and left-handed circularly polarized light incident thereon are transmitted; and an electrically switchable wave plate disposed between the first and second electrically switchable layers. The electrically switchable mirror may further comprise the following: a first phase compensator disposed between the first and second electrically switchable layers; an anti-reflection coating disposed on a surface of the first electrically switchable layer; a third electrically switchable layer of cholesteric liquid crystal material, the third electrically switchable layer having a first state in which right-handed circularly polarized light incident thereon is reflected and left-handed circularly polarized light incident thereon is transmitted and a second state wherein right-handed and left-handed circularly polarized light incident thereon are transmitted; a fourth electrically switchable layer of cholesteric liquid crystal material, the fourth electrically switchable layer having a first state in which left-handed circularly polarized light incident thereon is reflected and right-handed circularly polarized light incident thereon is transmitted and a second state wherein right-handed and left-handed circularly polarized light incident thereon are transmitted; a second phase compensator disposed between the third and fourth electrically switchable layers; a fifth electrically switchable layer of cholesteric liquid crystal material, the fifth electrically switchable layer having a first state in which right-handed circularly polarized light incident thereon is reflected and left-handed circularly polarized light incident thereon is transmitted and a second state wherein right-handed and left-handed circularly polarized light incident thereon are transmitted; and a sixth electrically switchable layer of cholesteric liquid crystal material, the sixth electrically switchable layer having a first state in which left-handed circularly polarized light incident thereon is reflected and right-handed circularly polarized light incident thereon is transmitted and a second state wherein right-handed and left-handed circularly polarized light incident thereon are transmitted. The first and second electrically switchable layers are effective for visible light having wavelengths in a range of 450 to 800 nm; the third and fourth electrically switchable layers are effective for IR light having wavelengths in a range of 750 to 1,200 nm; and the fifth and sixth electrically switchable layers are effective for light having wavelengths in a range of 1,000 to 1,300 nm.

A further aspect of the subject matter disclosed in detail below is an apparatus for protection from bright light sources, comprising an array of pixels, wherein each pixel comprises: a first electrically switchable layer of cholesteric liquid crystal material, the first electrically switchable layer having a first state in which right-handed circularly polarized light incident thereon is reflected and left-handed circularly polarized light incident thereon is transmitted and a second state wherein right-handed and left-handed circularly polarized light incident thereon are transmitted; a second electrically switchable layer of cholesteric liquid crystal material, the second electrically switchable layer having a first state in which left-handed circularly polarized light incident thereon is reflected and right-handed circularly polarized light incident thereon is transmitted and a second state wherein right-handed and left-handed circularly polarized light incident thereon are transmitted; and an electrically switchable wave plate disposed between the first and second electrically switchable layers.

Yet another aspect is a sight protection system comprising an optically transparent substrate and an electrically switchable mirror applied on a surface of the optically transparent substrate, wherein the electrically switchable mirror comprises: a first electrically switchable layer of cholesteric liquid crystal material, the first electrically switchable layer having a first state in which right-handed circularly polarized light incident thereon is reflected and left-handed circularly polarized light incident thereon is transmitted and a second state wherein right-handed and left-handed circularly polarized light incident thereon are transmitted; a second electrically switchable layer of cholesteric liquid crystal material, the second electrically switchable layer having a first state in which left-handed circularly polarized light incident thereon is reflected and right-handed circularly polarized light incident thereon is transmitted and a second state wherein right-handed and left-handed circularly polarized light incident thereon are transmitted; and an electrically switchable wave plate disposed between the first and second electrically switchable layers. The optically transparent substrate comprises one of the following: a window, a canopy or a visor.

Other aspects of electro-optical switchable mirror devices are disclosed below.

BRIEF DESCRIPTION OF THE DRAWINGS

FIG. 8 is a diagram showing a first exemplary configuration of a window layer structure for an electrically switchable mirror.

Reference will hereinafter be made to the drawings in which similar elements in different drawings bear the same reference numerals.

DETAILED DESCRIPTION

Figure 1:
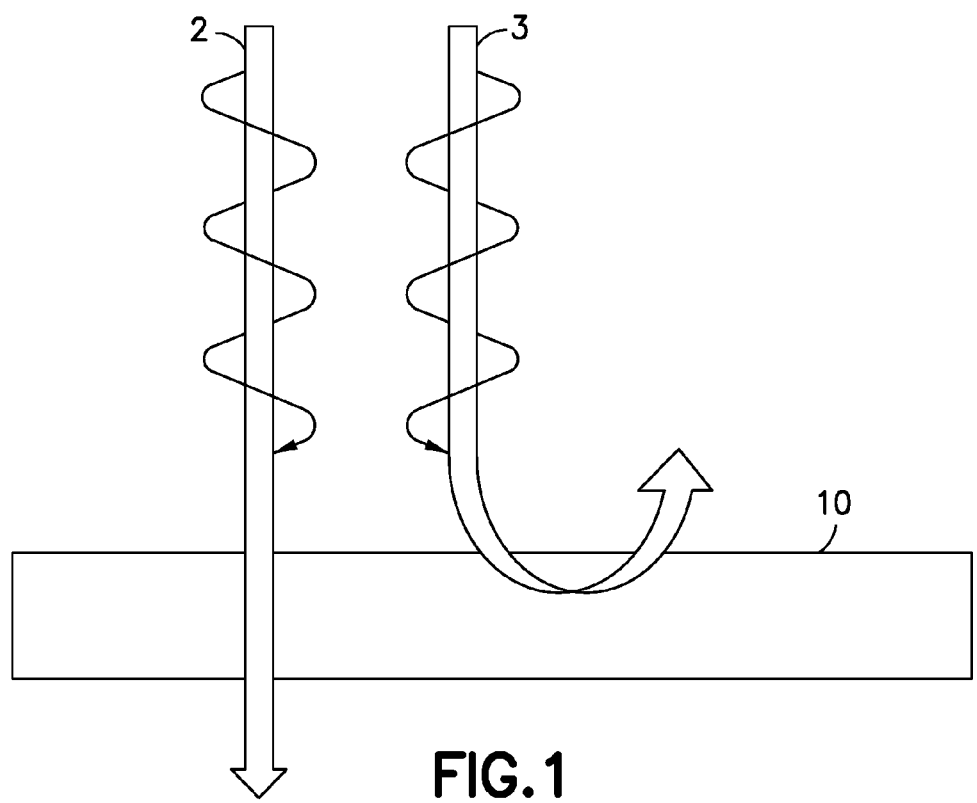
FIG. 1 is a diagram illustrating reflection and transmission properties of a layer of cholesteric liquid crystal material having single handedness (in this example, right-handedness) and a single helical pitch when no voltage bias is applied. The thin conductive electrodes on opposite sides of the layer are not shown.

The following detailed description is directed to systems and methods for the protection of vehicle crew members against existing and future high-intensity light sources threats such as laser and photonic weapons. The embodiments presented herein protect vehicle crew member vision from dazzle energy light sources due to travel directly into dispersed threats, such as sunlight and man-made focused light sources, while retaining nearly all of the window or canopy transparency.

An electrically switchable mirror may be integrated into a window, a number of windows or a canopy of a vehicle to provide rapid computer-controlled protective response along the threat line-of-sight. In addition, an off-the-shelf scene imaging system may provide a broad dynamic range, wavelength (e.g. color) response and night-vision capability. Fast frame rates will allow for fast system response times and good survivability to high power density. A pencil beam-sized high-intensity light source threat may be recognized by the scene imaging system via the small amount of larger-divergence incoherent light typically emitted by high-power lasers. The system will be integrated under computer control and may include helmet integrated sensors that provide eye location or eye position to provide line-of-sight protection to the aircrew faster than the blink response of the eye, while maintaining the spot protection as long as the high-intensity light source is on. This active window or canopy protection may also double in function as a line-of-sight sunshade for the crew members in the vehicle cockpit.

The system is designed to protect against broad illumination where a directed energy beam may or may not intersect a vehicle as a pencil-size beam, where at altitude, the beam footprint may be in square meters. Without making an entire window or canopy dark, the system must be able to provide accurate and directional aircrew protection between the crew member eyes and the light source threat. The system is designed to protect against wide wavelength bands and frequency-agile sources. Sensitivity and detection of the scene imagers should be rapid and broadband. The system is also designed to protect against low-power-density light sources. Scene imaging also enables exploitation of threat angles for the geolocation of high-intensity light source threats. The geolocation of these threats allows tracking and potentially engaging high-intensity light source weapons by location.

As previously mentioned, the electrically switchable mirror is designed, when installed in a window or canopy, to protect a pilot from a dazzling or blinding light source of arbitrary wavelength by switching layers made of cholesteric liquid crystals from a transmissive state to a reflective state within a selected portion of the electrically switchable mirror. The location and extent of this activated area will be dependent on the location and area of the bright light incident on the window or canopy. Before describing the laminated structure of the switchable mirror in detail, it may be helpful to first describe the relevant properties of cholesteric liquid crystals.

Cholesteric liquid crystals (CLCs) are self-organized, supramolecular structures of circularly polarized helicoidal components. Circularly polarized light in the direction of the structural anisotropy undergoes (wavelength dependent) reflection due to the coherent multiple scattering from the periodic helical structure, depending on the helical pitch. Ideal cholesteric structure does not impede the transmission of light of the opposite circular polarization. If an imposed electric field is increased above a threshold value, then the helical structures are "untwisted" and the material becomes transparent to incident light regardless of polarization. Increasing availability of materials with varied and controllable properties is leading to CLC structures that can be tailored for left-handed and right-handed polarization, as well as reflection wavelength and transmission quality.

FIG. 1 is a diagram illustrating reflection and transmission properties of a layer 10 of cholesteric liquid crystal material having single handedness (in this example, right-handedness) and a single helical pitch when no voltage bias, continuous or pulsed, is applied. The thin conductive electrodes on opposite sides of the layer are not shown. Arrow 2 represents incoming left-handed circularly polarized light of any wavelength, while arrow 3 represents incoming right-handed circularly polarized light of a single wavelength. As illustrated in FIG. 1, counter-polarized light transmits at any wavelength, while same-polarized light reflects at specific wavelengths depending on the pitch of the helicoidal (the rest transmits).

Any incident light on any material can be decomposed into colors (wavelengths); two polarization types: right-handed circularly polarized (RHCP) and left-handed circularly polarized (LHCP); and angle of incidence. By specifying the brightness at each color and angle of incidence, and the degree of RHCP and LHCP as well, then the incident light is fully characterized.

Figure 2:
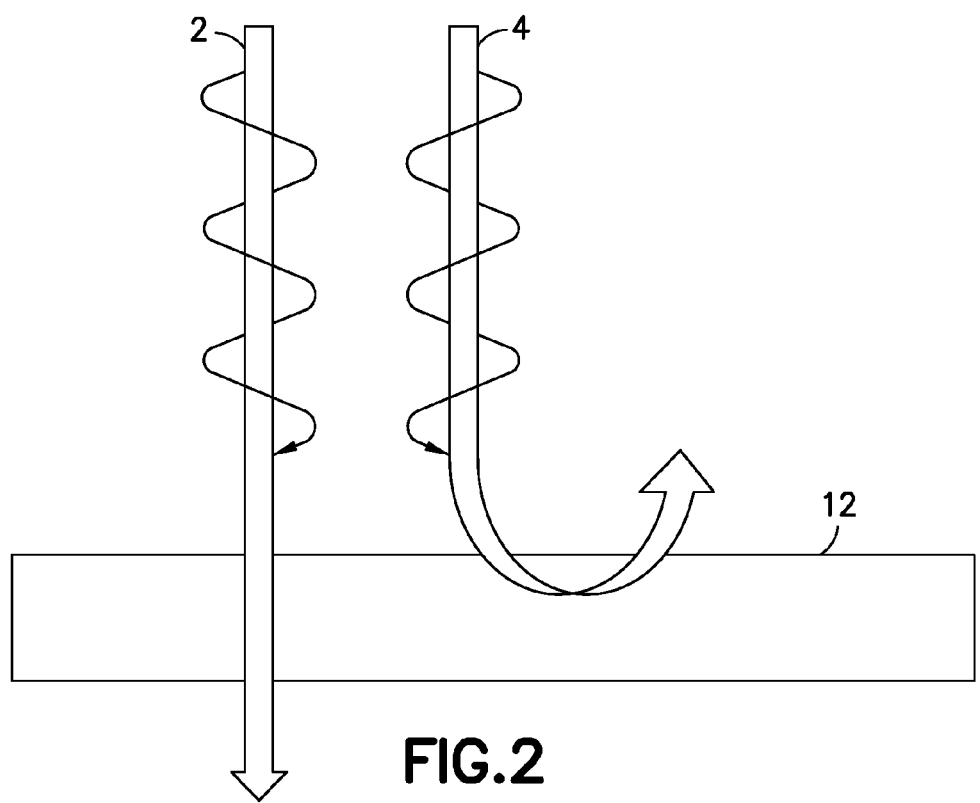
FIG. 2 is a diagram illustrating reflection and transmission properties of a superlayer stack of cholesteric liquid crystal material having single handedness (in this example, right-handedness) and multiple helical pitches/indices of refraction when no voltage bias is applied. Thin conductive electrodes on opposite sides of the stack are not shown.

FIG. 2 is a diagram illustrating reflection and transmission properties of a superlayer stack 12 of cholesteric liquid crystal material having single handedness (in this example, right-handedness) and multiple helical pitches/indices of refraction when no voltage bias, continuous or pulsed, is applied. The thin conductive electrodes on opposite sides of the stack are not shown. Arrow 2 represents incoming LHCP light of any wavelength, while arrow 4 represents incoming RHCP light of any wavelength within the cholesteric liquid crystal reflection bandwidth. As illustrated in FIG. 2, counter-polarized light transmits through the superlayer stack 12 at any wavelength, while the superlayer stack 12 of varied helicoidal properties leads to reflection of same-polarized light over a band of varied wavelengths.

Figure 3:
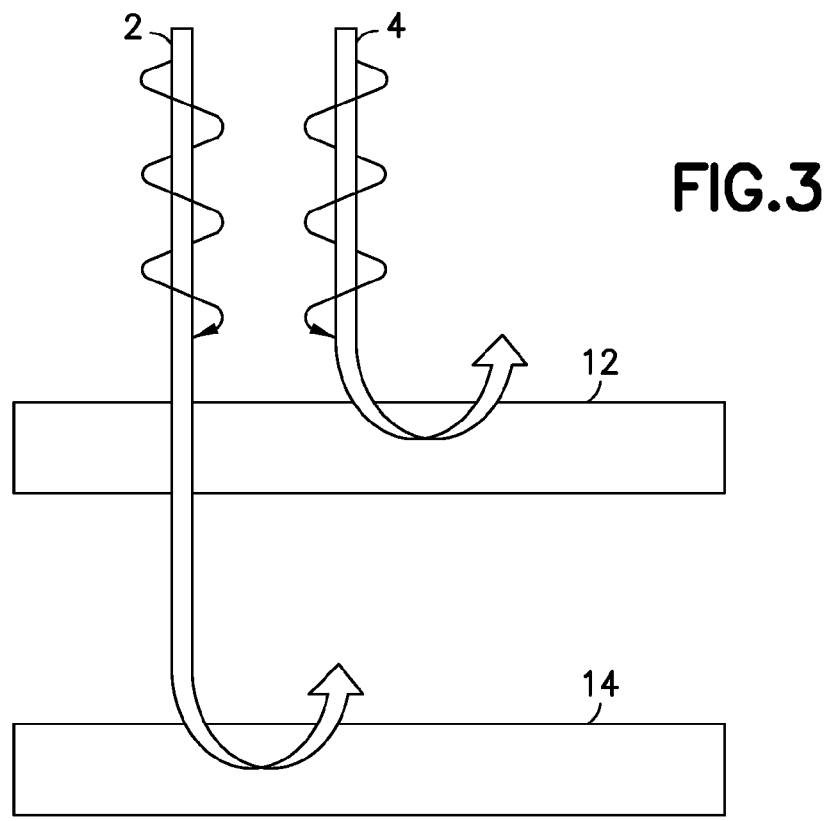
FIG. 3 is a diagram illustrating reflection and transmission properties of respective superlayer stacks of cholesteric liquid crystal material having single handedness (in this example, right-handedness and left-handedness respectively) and multiple helical pitches/indices of refraction when no voltage bias is applied and before the light reflected by the stack having left-handed pitches impinges on the stack having right-handed pitches. Thin conductive electrodes on opposite sides of each stack are not shown.

FIG. 3 is a diagram illustrating reflection and transmission properties of respective superlayer stacks 12 and 14 of cholesteric liquid crystal material having single handedness (in this example, right-handedness and left-handedness respectively) and multiple helical pitches/indices of refraction when no voltage bias, continuous or pulsed, is applied. The thin conductive electrodes on opposite sides of each stack are not shown. Arrow 2 represents incoming LHCP light of any wavelength, while arrow 4 represents incoming RHCP light of any wavelength. As illustrated in FIG. 3, RHCP light will be reflected by the superlayer stack 12 having right-handed pitches over a band of varied wavelengths, while LHCP light is transmitted by superlayer stack 12 and then reflected by superlayer stack 14 having left-handed pitches over a band of varied wavelengths.

Figure 4:
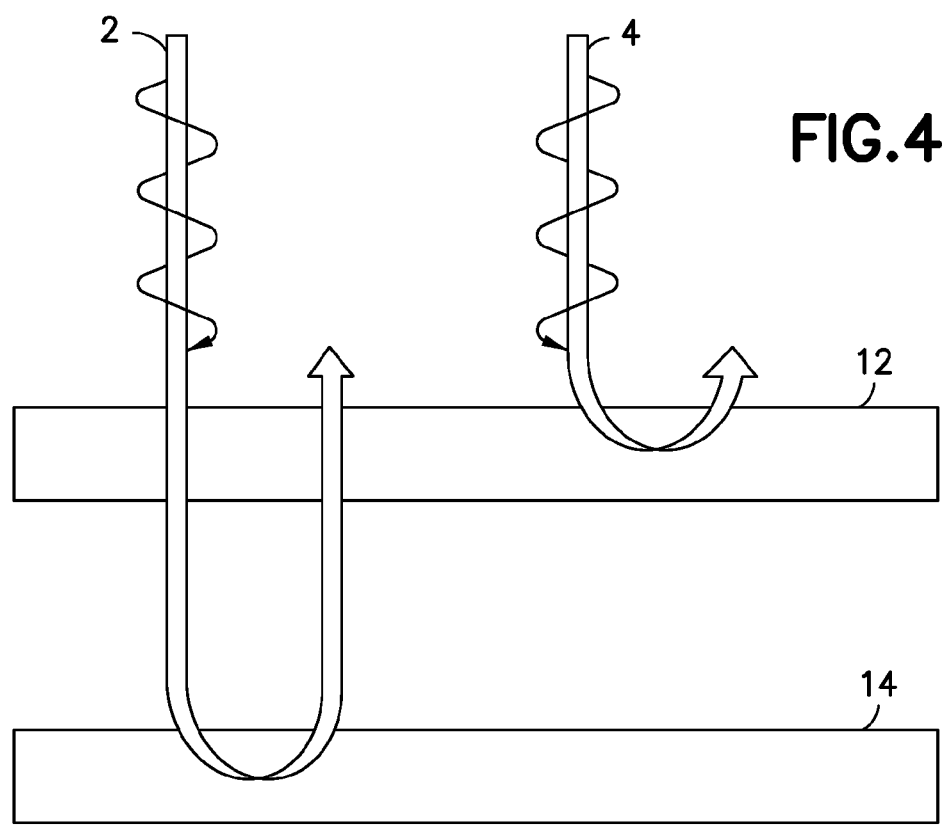
FIG. 4 is a diagram illustrating reflection and transmission properties of the stacks depicted in FIG. 3 when no voltage bias is applied and after the light reflected by the stack having left-handed pitches has impinged on and passed through the stack having right-handed pitches.

FIG. 4 is a diagram illustrating reflection and transmission properties of the superlayer stacks 12 and 14 depicted in FIG. 3 when no voltage bias, continuous or pulsed, is applied and after the LHCP light has been reflected by the superlayer stack 14 having left-handed pitches and then passed through the superlayer stack 12 having right-handed pitches. Reflection changes handedness: LHCP light becomes RHCP light in the new direction. However, the apparent handedness of the superlayer stack 12 of right-handed pitch material (as approached from the top) changes as well when approached back out. Therefore: the initial LHCP component of the light passes through the superlayer stack 12 without interacting twice.

Figure 5:
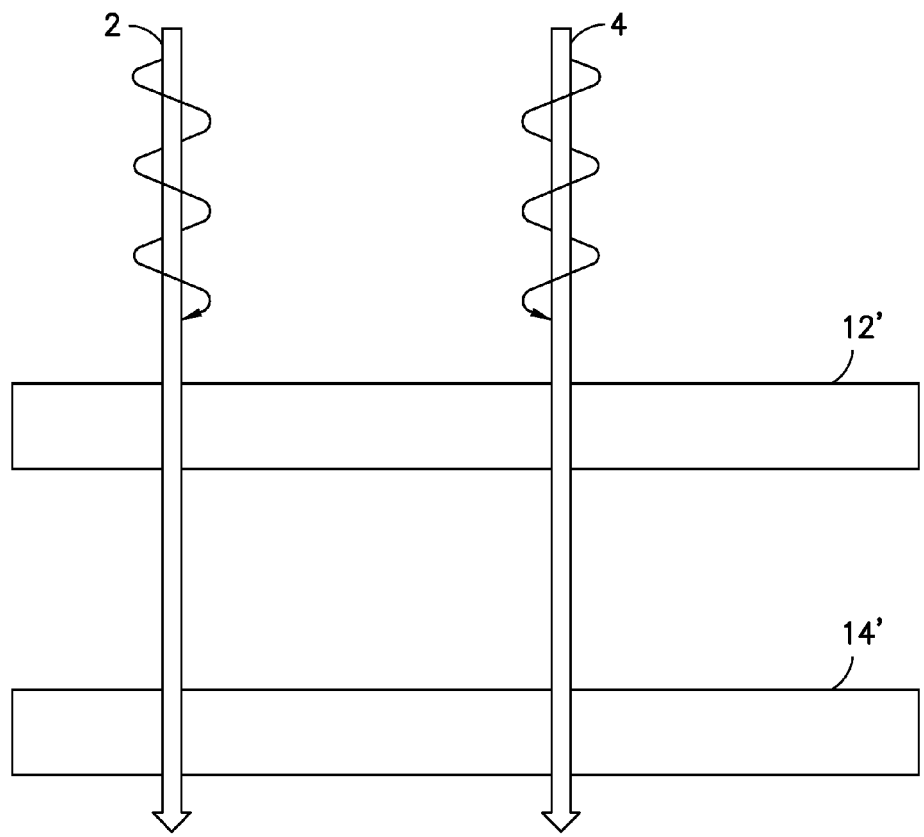
FIG. 5 is a diagram illustrating reflection and transmission properties of the stacks depicted in FIG. 3 when a voltage bias is applied to both stacks.

FIG. 5 is a diagram illustrating reflection and transmission properties of the superlayer stacks 12 and 14 depicted in FIG. 3 when a voltage bias in excess of a specified threshold is applied to both stacks. When the voltage bias, continuous or pulsed, exceeds the threshold, all helices "stretch" and align. The materials become transparent regardless of wavelength or polarization sense.

The above-described properties of CLCs can be used to provide an electrically switchable mirror for a window or canopy that is able to block distracting, dazzling or blinding light (sunshine, laser light, etc.) from a specific direction towards a pilot. The reflection properties of the electrically switchable mirror disclosed herein are broad-band, i.e., not tied to a particular wavelength. In accordance with some embodiments, the electrically switchable mirror comprises an array of addressable contiguous pixels which can be selectively activated to provide direction-specific protection while leaving the rest of the window or canopy clear. Preferably the electrically switchable pixels can be activated faster than the human eye can blink. In an unactivated state, the electrically switchable mirror is transparent. In the event of a power failure, the electrically switchable mirror has means which allow the pilot to still see through the window or canopy. The electrically switchable mirror can also be used to protect cameras or sensors from bright lights or lasers.

Figure 6:
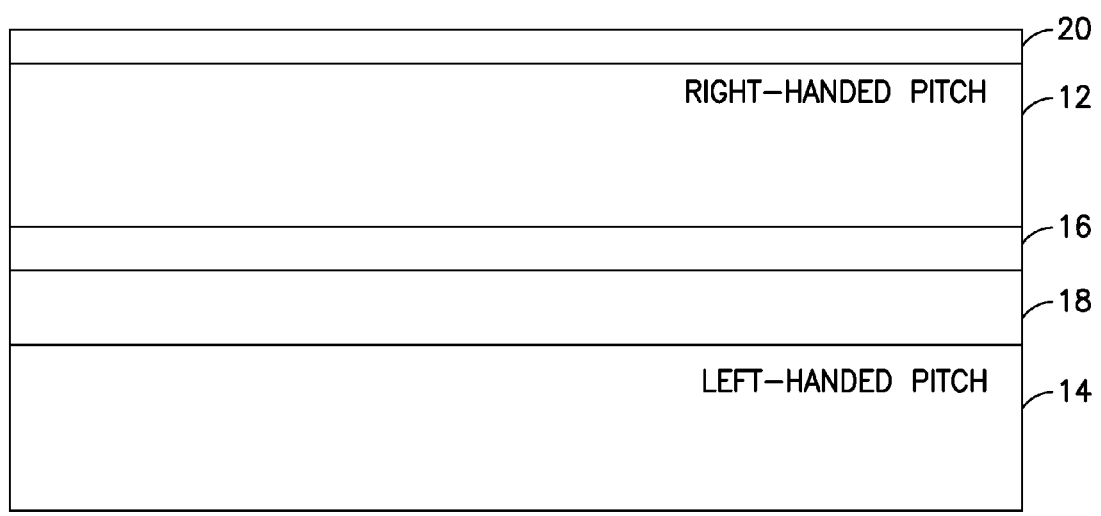
FIG. 6 is a diagram showing a configuration of a window layer structure in accordance with some embodiments.

FIG. 6 is a diagram showing a configuration of a window layer structure for an electrically switchable mirror in accordance with some embodiments. This electrically switchable mirror comprises: (1) a superlayer stack 12 comprising a first electrically switchable layer of CLC material having a first state in which RHCP light incident thereon is reflected and LHCP light incident thereon is transmitted and a second state wherein RHCP and LHCP light incident thereon are transmitted; (2) a superlayer stack 14 comprising a second electrically switchable layer of CLC material having a first state in which LHCP light incident thereon is reflected and RHCP light incident thereon is transmitted and a second state wherein RHCP and LHCP light incident thereon are transmitted; (3) an electrically switchable half-wave plate 16 disposed between the superlayer stacks 12 and 14; (4) a phase compensator 18 disposed between the half-wave plate 16 and the superlayer stack 14; and (5) anti-reflection coatings 20 disposed on an external surface of the superlayer stack 12.

The half-wave plate 16 shifts the left-handed circular polarization when unbiased (i.e., no applied voltage). As a result, the left-handed pitch superlayer stack 14 becomes transparent to LHCP light when it also is unbiased. In cases where about 50% of the light reaching the right-handed pitch superlayer stack 12 passes through the latter, that transmitted portion of the light will also pass through the unbiased left-handed pitch superlayer stack 14, meaning that the electrically switchable mirror will be ~50% transmissive in the event of a power failure.

The phase compensator 18 then shifts the left-handed circular polarization again when the half-wave plate 16 is biased. The result is that the biased left-handed pitch superlayer stack 14 returns to being fully reflective vis-a-vis LHCP light. The phase compensator 18 is a thin optical layer to improve the device opacity under larger viewing angles in the mirror state. In accordance with the embodiments disclosed herein, the phase compensator 18 is made of a thin layer of liquid crystal.

The thin electrodes for activating various layers of the electrically switchable mirror depicted in FIG. 6 are not shown to avoid clutter. Coatings may be added to mitigate surface reflection effects. More material layers may be added within the right-handed pitch superlayer stack 12 and left-handed pitch superlayer stack 14 to also improve performance at off-axis angles of incidence.

Figure 7A:
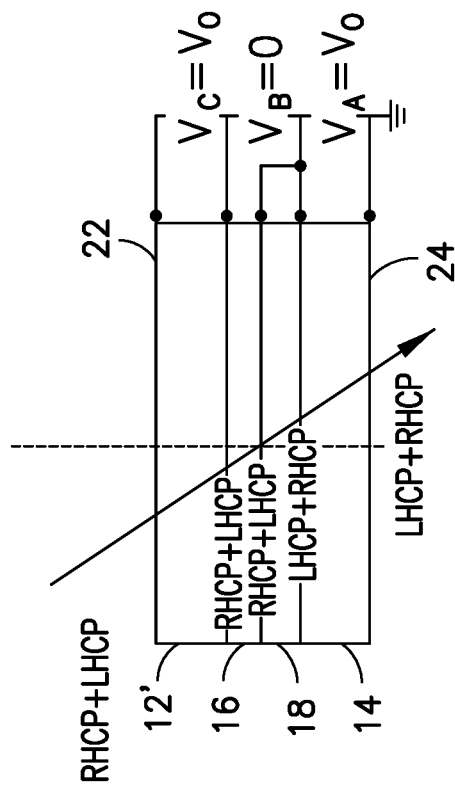
FIGS. 7A through 7C illustrate reflection and transmission properties of the window layer structure depicted in FIG. 6 in the following respective states: during power failure (FIG. 7A); when a voltage bias is applied to the superlayer stacks of cholesteric liquid crystal material and a half-wave plate is switched off (FIG. 7B); and when no voltage bias is applied to the superlayer stacks of cholesteric liquid crystal material and the half-wave plate is switched on (FIG. 7C).
Figure 7B:
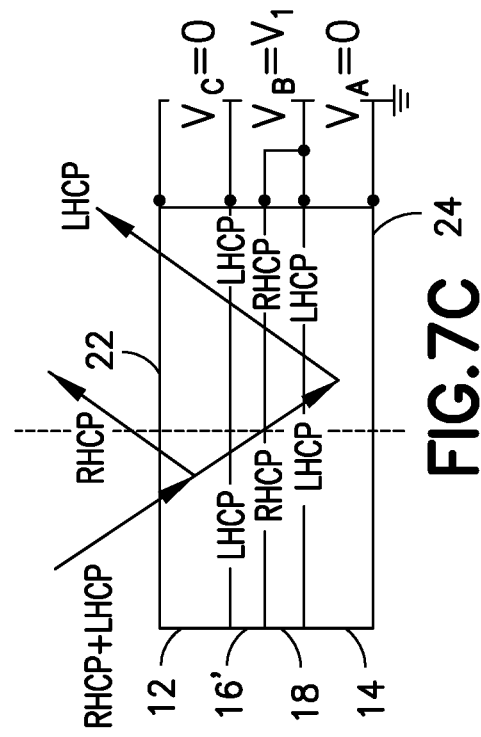
Figure 7C:
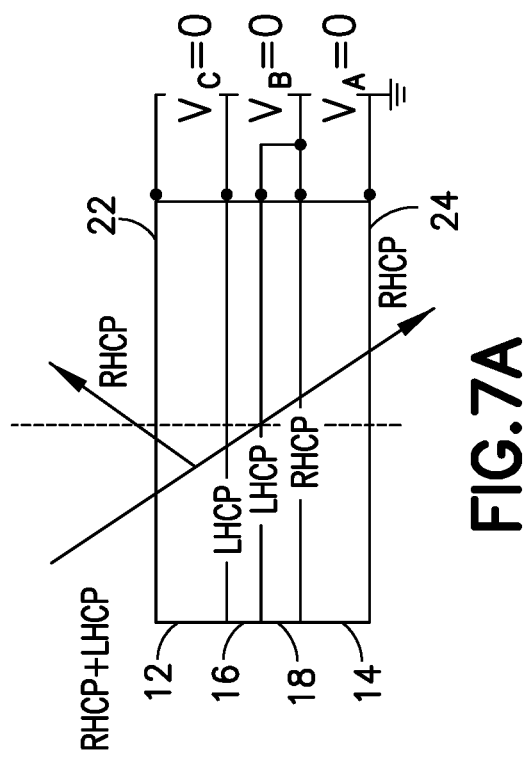

FIGS. 7A through 7C illustrate reflection and transmission properties of the window layer structure of the electrically switchable mirror depicted in FIG. 6 in the following respective states: during power failure (FIG. 7A); when a voltage bias, continuous or pulsed, is applied to the superlayer stacks 12 and 14 of cholesteric liquid crystal material and a half-wave plate 16 is switched off (FIG. 7B); and when no voltage bias, continuous or pulsed, is applied to the superlayer stacks 12 and 14 of cholesteric liquid crystal material and the half-wave plate 16 is switched on (FIG. 7C). The anti-reflection coatings are not shown in FIGS. 7A through 7C. Transparent electrodes are disposed between the layers of the electrically switchable mirror and on the external surfaces of the depicted window layer structure. A transparent electrode 22 is disposed on the upper surface of superlayer stack 12, while a transparent electrode 24 is disposed on the lower surface of superlayer stack 14. The transparent electrodes disposed between the layers of the electrically switchable mirror are not identified by reference number to avoid clutter in these drawings. In FIGS. 7A through 7C, the voltage between the transparent electrode 22 and the transparent electrode between the superlayer stack 12 and the half-wave plate 16 is indicated by $V_C$; the voltage between the transparent electrodes on opposite sides of the half-wave plate 16 is indicated by $V_B$; and the voltage between the transparent electrode 24 and the transparent electrode between the half-wave plate 16 and the phase compensator 18 is indicated by $V_A$.

In the passive state depicted in FIG. 7A, the electrically switchable mirror is approximately 50% reflective. The impinging light comprises RHCP light and LHCP light. The RHCP light is reflected by the unbiased ($V_C$=0) right-handed pitch superlayer stack 12, which acts like a Bragg reflector. The LHCP light transmitted by the unbiased right-handed pitch superlayer stack 12 is also transmitted by the unbiased ($V_B$=0) half-wave plate 16. Thereafter the LHCP light transmitted by the unbiased half-wave plate 16 is phase-shifted by the phase compensator 18 to become RHCP light. The RHCP light exiting the phase compensator 18 is then transmitted by the unbiased ($V_A$=0) left-handed pitch superlayer stack 14.

In the biased state depicted in FIG. 7B ($V_A$=$V_C$=$V_0$, $V_B$=0), the electrically switchable mirror is transparent to both RHCP and LHCP light.

In the biased state depicted in FIG. 7C ($V_A$=$V_C$=0, $V_B$=$V_1$), the electrically switchable mirror is 100% reflective to both RHCP and LHCP light. The impinging light comprises RHCP light and LHCP light. The RHCP light is reflected by the unbiased ($V_C$=0) right-handed pitch superlayer stack 12 as previously described. The LHCP light transmitted by the unbiased right-handed pitch superlayer stack 12 is un-phase-shifted by the biased ($V_B$=$V_1$) half-wave plate 16 and is maintained to be LHCP light. The LHCP light exiting the biased half-wave plate 16 is then maintained in perfect LHCP over a wide viewing angle range by the phase compensator 18. The LHCP light exiting the phase compensator 18 is then reflected by the unbiased ($V_A$=0) left-handed pitch superlayer stack 14.

Thus when the power failure occurs, the window or canopy will be semi-transparent. In order to accomplish this, a phase shifter (i.e., the half-wave plate 16) is introduced. The half-wave plate 16 is also switchable. In accordance with one proposed configuration, when power fails, half-wave plate 16 introduces half-wave phase retardation at 620 nm; while with power on, it is switched into a homeotropic state so that no phase retardation occurs.

The configuration depicted in FIGS. 7A through 7C eliminates the undesirable power-loss failed mode. The power-loss failed condition results in an approximately 50%-transmissive window or canopy.

If the design space limits the wavelength range due to material availabilities, incident angle coverage or other factor, multiple superlayer stacks effective in different (optionally, partially overlapping) wavelength bands.

A few candidate configurations of the layer structure in the complete panel were evaluated and utilized to simulate and preliminarily optimize the panel spectral performance. One such panel configuration is schematically illustrated in FIG. 8.

FIG. 8 is a diagram showing a first exemplary configuration of a window layer structure with embedded transparent electrodes for an electrically switchable mirror that includes visible spectrum layers and infrared spectrum layers. More specifically, the electrically switchable mirror depicted in FIG. 8 is designed to have two separately addressable spectral sections over the entire 400-1100 nm spectrum. The first section is in the visible range of 425-800 nm, while second section is in the infrared (IR) range of 750-1200 nm. Each spectral section is supported by its corresponding cholesteric liquid crystal (CLC) materials.

The electrically switchable mirror depicted in FIG. 8 (transparent electrodes and anti-reflection coatings are not shown) comprises: (1) a first superlayer stack 30 comprising a first electrically switchable layer of CLC material having a first state in which RHCP visible light incident thereon is reflected and LHCP visible light incident thereon is transmitted and a second state wherein RHCP and LHCP visible light incident thereon are transmitted; (2) a second superlayer stack 36 comprising a second electrically switchable layer of CLC material having a first state in which LHCP visible light incident thereon is reflected and RHCP visible light incident thereon is transmitted and a second state wherein RHCP and LHCP visible light incident thereon are transmitted; (3) an electrically switchable half-wave plate 34 disposed between the superlayer stacks 30 and 36; (4) a first phase compensator 32 disposed between the half-wave plate 34 and the first superlayer stack 30; (5) a third superlayer stack 38 (adjacent the second superlayer stack 36) comprising a third electrically switchable layer of CLC material having a first state in which RHCP IR light incident thereon is reflected and LHCP IR light incident thereon is transmitted and a second state wherein RHCP and LHCP IR light incident thereon are transmitted; (6) a fourth superlayer stack 42 comprising a fourth electrically switchable layer of CLC material having a first state in which LHCP IR light incident thereon is reflected and RHCP IR light incident thereon is transmitted and a second state wherein RHCP and LHCP IR light incident thereon are transmitted; and (7) a second phase compensator 40 disposed between the third and fourth superlayer stacks 38 and 42. No half-wave plate is needed between the third and fourth superlayer stacks 38 and 42 because 50% transmission of IR light is not required in the power-fail mode.

Comparing the configurations depicted in FIGS. 6 and 8, it should be noted that for the visible spectrum layers, the effect is the same when the quarter-wave plate is disposed between the right-handed pitch superlayer stack and the phase compensator (as shown in FIG. 6) and when the phase compensator is disposed between the right-handed pitch superlayer stack and the quarter-wave plate (as shown in FIG. 8).

In the design shown in FIG. 8, the parameters of superlayer stacks have been valued according to the existing liquid crystal composition. The superlayer stacks 30 and 36 in the visible range each have a thickness of 20 μm, while the superlayer stacks 38 and 42 in the IR range each have a thickness of 30 μm. The phase compensators are used for maintaining the required optical density (OD) under large incident angles (e.g., 50 degrees). The quarter-wave plate is for achieving ~50% visible transmittance. The approximate birefringence Δn and the layer thickness d for the seven layers depicted in FIG. 8 are listed in Table 1 (the Δn values for the superlayer stacks are average values).

TABLE 1

| Layer | Δn | d (μm) |
|---|---|---|
| RCLC Visible | 0.18 | 20 |
| 1$^{st}$ Phase Comp. | 0.18 | 9 |
| Half-wave plate | 0.006 | 5 |
| LCLC Visible | 0.18 | 20 |
| RCLC IR | 0.18 | 30 |
| 2$^{nd}$ Phase Comp. | 0.18 | 6 |
| LCLC IR | 0.18 | 30 |

Optionally, an intermediate wave plate (not listed in Table 1) may be provided between the superlayer stacks 38 and 42 depicted in FIG. 8 to provide the 50% transmissive state in the infrared range as well.

Figure 9:
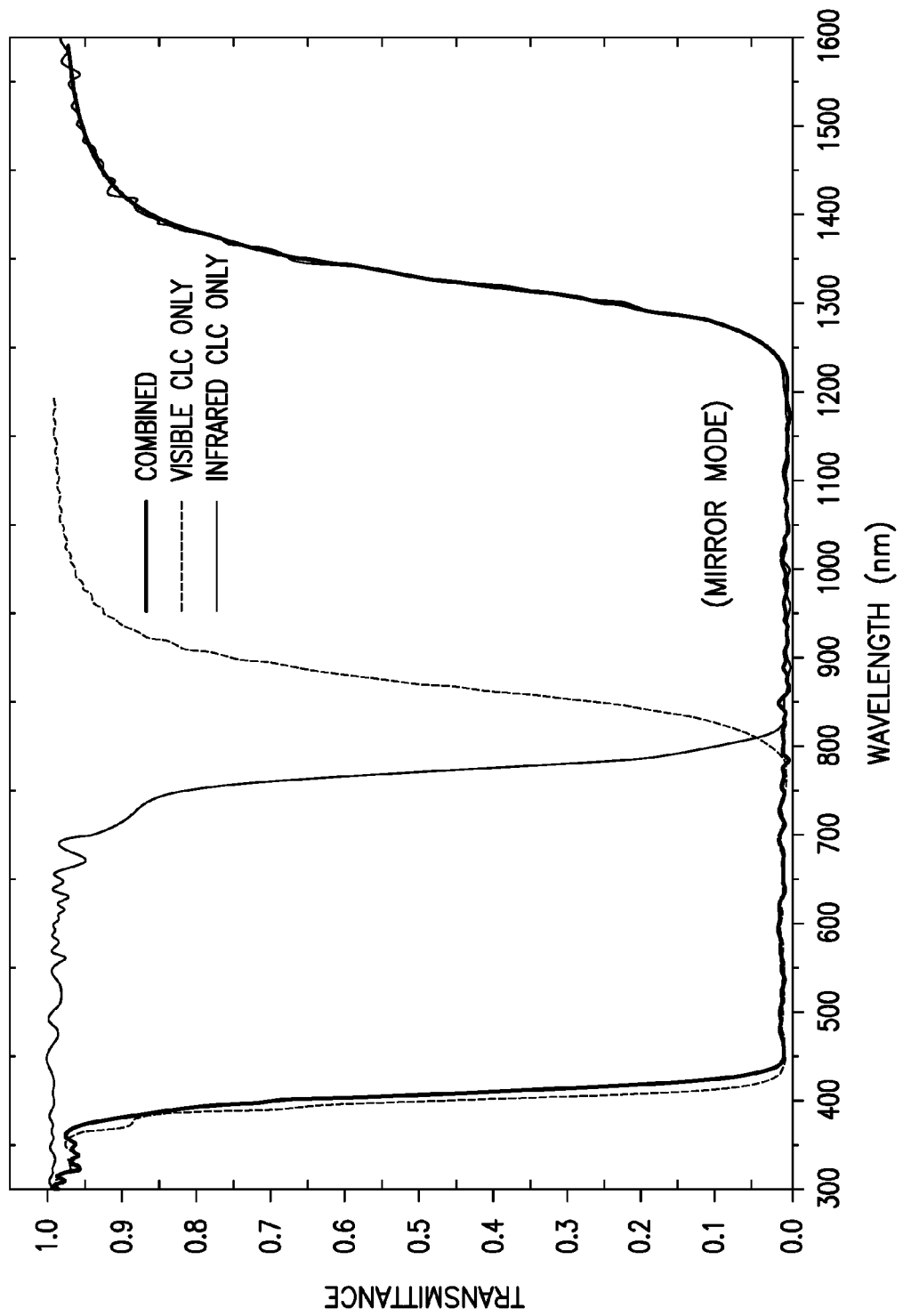
FIG. 9 is a graph showing the spectral performance (transmittance versus wavelength) of the window depicted in FIG. 8 at an angle of incidence of 0 degrees.

A computer program was used to simulate the entire panel performance based on the structure depicted in FIG. 8. FIG. 9 illustrates the simulated panel spectral response in the mirror mode at normal incidence for the two separate CLC pairs and in combination, respectively. No optical losses, such as scattering and optical absorptions for LC material in the blue and ultraviolet (UV) regions, were included in the simulation. Also, indium tin oxide (ITO) absorptions in IR regions were not taken into account in the simulation. For the simplicity of the simulation, no substrate glass was included either. As can be seen in FIG. 9, the optical leakage in the reflection state is minimized, and its extinction ratio should be around OD=1 to OD=2 under the normal angle of incidence (i.e., 0 degree).

It is well known that at a large incident angle, the CLC spectral coverage experiences a blue shift, according to Bragg's law. In addition, the light leakage in the reflection state is significantly increased due to the polarization mess-up of the transmitted beam from the first CLC at an angle of incidence greater than 20 degrees. In order to restore the polarization state so that the optical leakage is minimized in the reflection state, a positive C-plate phase compensation (referred to herein as a "phase compensator") film is introduced. The birefringence and thickness of the phase compensator were optimized.

Figure 10:
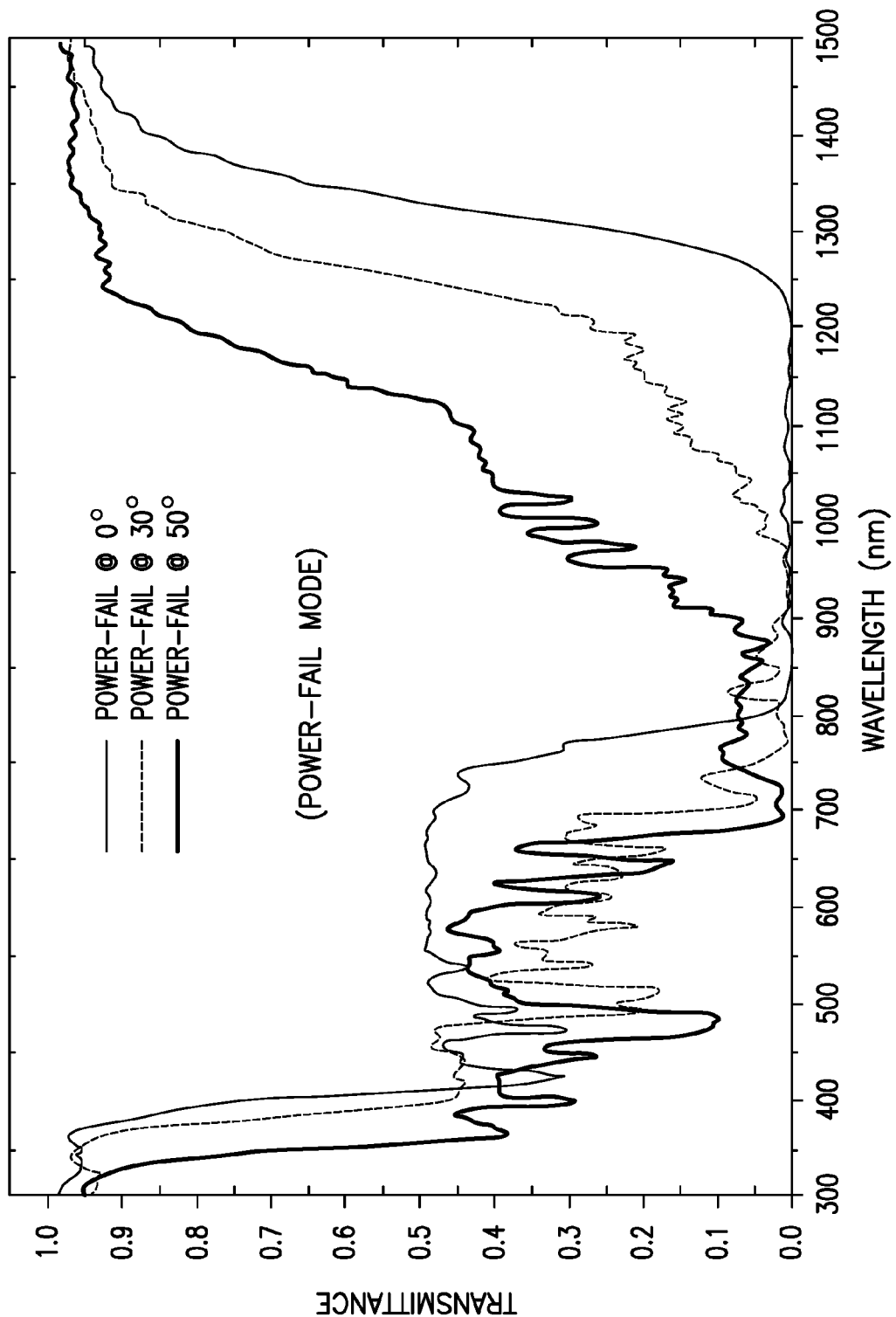
FIG. 10 is a graph showing the spectral performance (transmittance versus wavelength) of the window depicted in FIG. 9 in power failure state at three angles of incidence (i.e., 0, 30 and 50 degrees).

FIG. 10 shows the spectral performance of the complete panel in the power failure mode, where a semi-transparent state in the visible range is observed under three incident angles of 0, 30 and 50 degrees. As can be seen, the spectral coverage is broad enough for the visible region of 400-700 nm even at the largest incident angle of 50 degrees. Averaging all incident angles in the power failure state, the total transmittance should be around 30-48%, which should be sufficient for the pilot or operator to see the outside scene without much difficulty.

Figure 11:
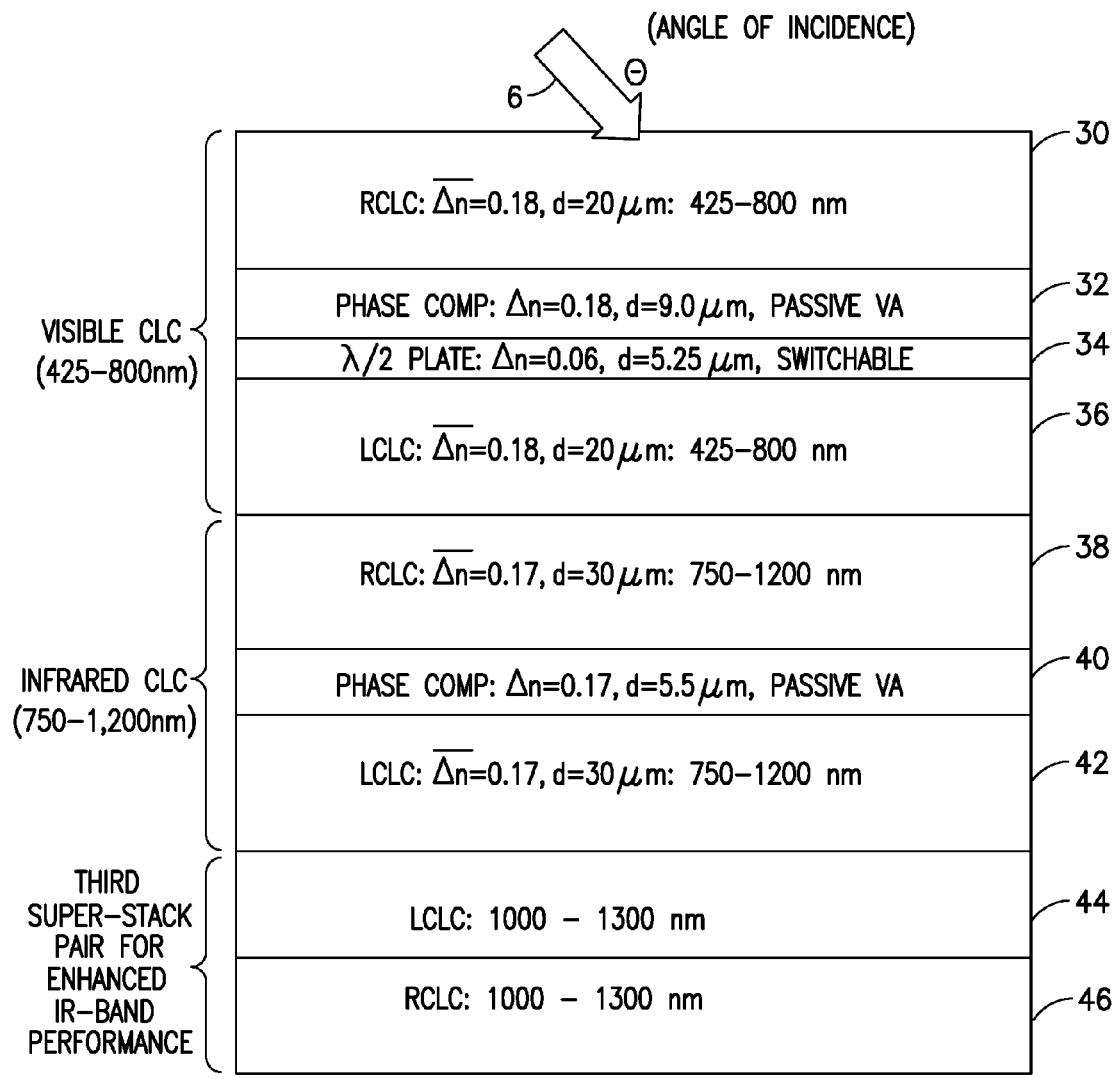
FIG. 11 is a diagram showing a second exemplary configuration of a window layer structure for an electrically switchable mirror.

FIG. 11 is a diagram showing a second exemplary configuration of a window layer structure with embedded transparent electrodes for an electrically switchable mirror having enhanced IR-band performance. In order to fully cover the desired spectral coverage with sufficient light blockage in laser protection mode, the device design shown in FIG. 8 can be modified by adding two more CLC superlayer stacks 44 and 46, as schematically illustrated in FIG. 11. Therefore, the device has a total of nine layers.

The electrically switchable mirror depicted in FIG. 11 comprises: (1) a first superlayer stack 30 comprising a first electrically switchable layer of CLC material having a first state in which RHCP visible light (having wavelengths in the range 425-800 nm) incident thereon is reflected and LHCP visible light (having wavelengths in the range 425-800 nm) incident thereon is transmitted and a second state wherein RHCP and LHCP visible light (having wavelengths in the range 425-800 nm) incident thereon are transmitted; (2) a second superlayer stack 36 comprising a second electrically switchable layer of CLC material having a first state in which LHCP visible light (having wavelengths in the range 425-800 nm) incident thereon is reflected and RHCP visible light (having wavelengths in the range 425-800 nm) incident thereon is transmitted and a second state wherein RHCP and LHCP visible light (having wavelengths in the range 425-800 nm) incident thereon are transmitted; (3) an electrically switchable half-wave plate 32 disposed between the superlayer stacks 30 and 36; (4) a first phase compensator 34 disposed between the half-wave plate 32 and the second superlayer stack 36; (5) a third superlayer stack 38 (adjacent the second superlayer stack 36) comprising a third electrically switchable layer of CLC material having a first state in which RHCP IR light (having wavelengths in the range 750-1,200 nm) incident thereon is reflected and LHCP IR light (having wavelengths in the range 750-1,200 nm) incident thereon is transmitted and a second state wherein RHCP and LHCP IR light (having wavelengths in the range 750-1,200 nm) incident thereon are transmitted; (6) a fourth superlayer stack 42 comprising a fourth electrically switchable layer of CLC material having a first state in which LHCP IR light (having wavelengths in the range 750-1,200 nm) incident thereon is reflected and RHCP IR light (having wavelengths in the range 750-1,200 nm) incident thereon is transmitted and a second state wherein RHCP and LHCP IR light (having wavelengths in the range 750-1,200 nm) incident thereon are transmitted; (7) a second phase compensator 40 disposed between the third and fourth superlayer stacks 38 and 42; (8) a fifth superlayer stack 44 (adjacent the fourth superlayer stack 42) comprising a fifth electrically switchable layer of CLC material having a first state in which RHCP IR light (having wavelengths in the range 1,000-1,300 nm) incident thereon is reflected and LHCP IR light (having wavelengths in the range 1,000-1,300 nm) incident thereon is transmitted and a second state wherein RHCP and LHCP IR light (having wavelengths in the range 1,000-1,300 nm) incident thereon are transmitted; and (9) a sixth superlayer stack 42 comprising a fourth electrically switchable layer of CLC material having a first state in which LHCP IR light (having wavelengths in the range 1,000-1,300 nm) incident thereon is reflected and RHCP IR light (having wavelengths in the range 1,000-1,300 nm) incident thereon is transmitted and a second state wherein RHCP and LHCP IR light (having wavelengths in the range 1,000-1,300 nm) incident thereon are transmitted.

The electrically switchable mirrors disclosed herein preferably comprise conformable plastic layers that can be easily applied on a surface of an optically transparent substrate, such as a window or canopy. Each electrically switchable mirror may comprise an array of addressable pixels. Each pixel may have a laminated structure similar if not identical to one of the configurations respectively shown in FIGS. 6, 8 and 11. There is also an index matching coating that is applied between the liquid crystal layer and the substrate. The index matching coating builds a bridge that smoothes the refractive index transition between the liquid crystal and substrate to reduce the Fresnel reflection and thus the light loss.

Figure 12:
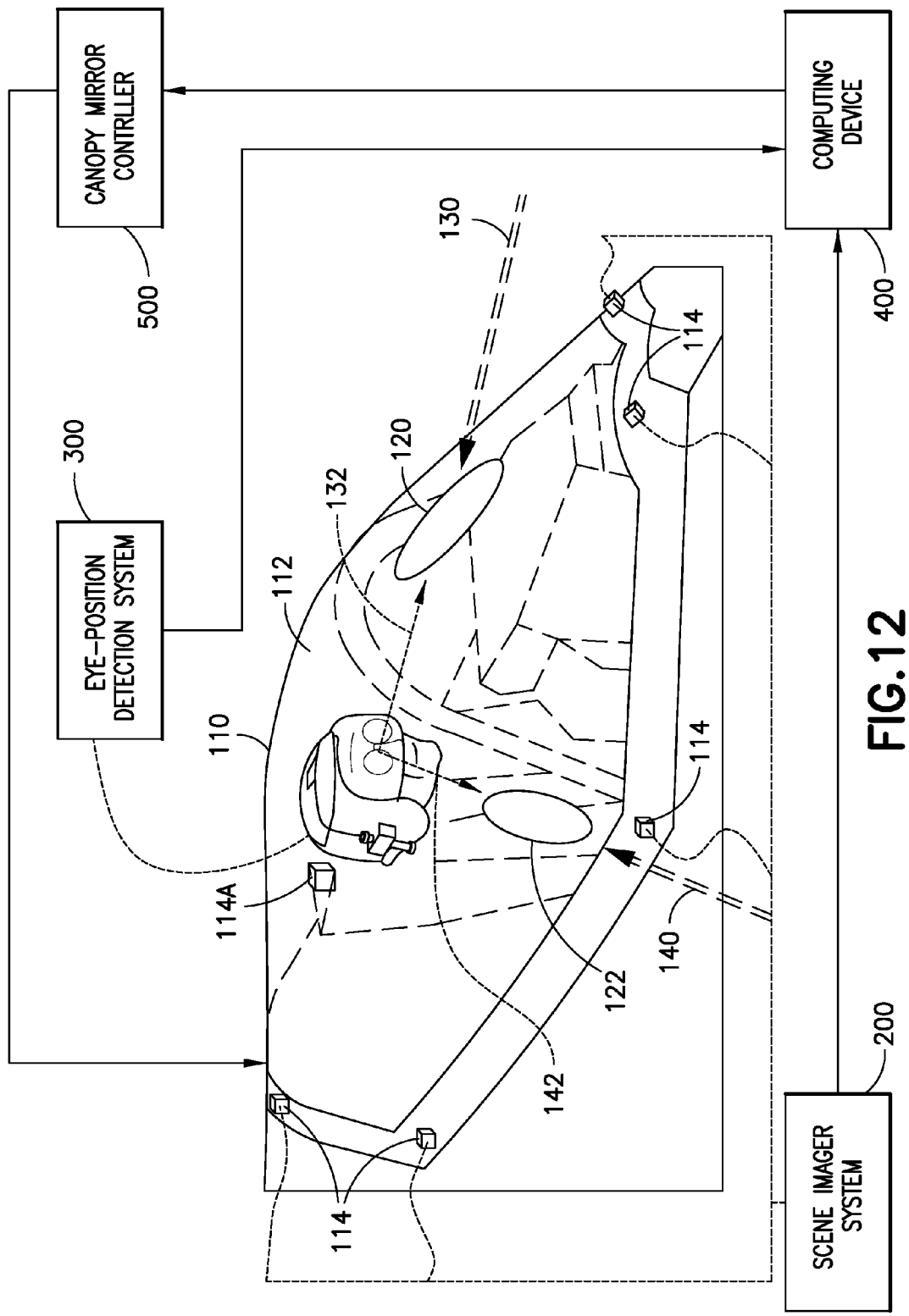
FIG. 12 is a schematic diagram identifying subsystems of a high-intensity light source blocking system on an aircraft as disclosed herein.

FIG. 12 is a schematic diagram identifying subsystems of a high-intensity light source blocking system on an aircraft with a cockpit-enclosing canopy 110. An inside portion of canopy 110 has an electrically switchable mirror 112 attached thereto for blocking high-intensity light sources from injuring or dazzling the crew member(s). The high-intensity light source blocking system comprises a scene imager system 200 which processes data received from a plurality of scene imager photodetectors 114 disposed around the periphery of the canopy 110 and external to the crew member cockpit.

Additionally, a scene imager video camera 114A may be internally located within the crew member cockpit to detect any high-intensity light sources that enter the canopy 110. The scene imager video camera 114A monitors the cockpit area for direct, scattered and reflective high-intensity light sources. The scene imager system 200 may employ a modeling function to determine what portions of the electrically switchable mirror 112 should be activated based on a calculated path of bright light from a high-intensity light source. Additionally, the scene imager system 200 may employ a direct measurement function that determines which reflective surfaces or bright spots/areas in the cockpit may present a danger to the crew members and then determines which areas of the electrically switchable mirror 112 should be activated to eliminate these dangerous bright spots/areas.

The scene imager system 200 processes the outputs of every scene imager photodetector 114 and the video camera 114A to determine and output the light source intensity, the light source frequency and the light source direction relative to the crew member cockpit. The scene imager system 200 may take the form of a computer configured to determine a frequency and an intensity value of the incoming bright light and to further determine the angle of the incoming bright light relative to the crew member cockpit.

Additionally, the scene imager system 200 can be configured to detect direct, scattered and reflected light sources relative to the crew member position/eye position. A crew member position/eye position detection system 300 detects and outputs data representing a position/eye position of a crew member relative to the interior of the cockpit. A portion of crew member position/eye position detection system 300 may reside in a crew member helmet, or may be internally mounted within the cockpit apart from any crew member helmet. All outputs from the scene imager system 200 and the crew member position/eye position detection system 300 are fed into a computing device 400 that calculates whether the light source intensity is equal to or above a predetermined threshold or not and outputs control signals to a canopy mirror controller 500 when the threshold is reached or exceeded. The canopy mirror controller 500 in turn comprises a computer configured to activate one or more selected portions of the electrically switchable mirror 112 in response to the control signals from the computing device 400.

If the light source intensity is above the predetermined threshold, then a portion, or portions, if more than one crew member position/eye position input are received, of the electrically switchable mirror 112 are activated to reflect the incoming bright light when the crew member position/eye position would be in a direct line with incoming light from the high-intensity light source.

For example, as illustrated in FIG. 12, if a first high-intensity light source 130 intersects with a crew members' calculated position/eye position 132, the area 120 on the electrically switchable mirror 112 is activated to reflect incoming light from the first high-intensity light source 130. Similarly, if a second high-intensity light source 140 intersects with a crew members' calculated position/eye position 142, the area 122 on the electrically switchable mirror 112 is activated to reflect incoming light from the second high-intensity light source 140. These areas 120 and 122 on the canopy may be rendered reflective independent of whether the crew member is actually looking at either high-intensity light source. In this manner, potential damage to the crew member's peripheral vision is prevented by blocking these light sources irrespective of the direction of the crew member's actual line-of-sight, but rather based on the actual position/eye position of the crew member relative to the cockpit.

In accordance with one embodiment, the electrically switchable mirror 112 comprises a multiplicity of addressable contiguous electrically switchable mirror elements, referred to herein as "pixels". In such embodiments, activating any portion of the electrically switchable mirror 112 (such as area 120 or 122 shown in FIG. 12) comprises addressing and electrically switching a respective group of pixels in the area to become reflective.

In accordance with alternative embodiments, the protection capability described above can be implemented in thin stacks, any one of which would not meet specifications. For instance, the visible region protection could be implemented as three switchable mirror stacks instead of one larger stack. One purpose of this approach would be to use subsequent stacks to "cover" the spaces between pixels of the first stack: each subsequent stack has pixels that are larger or smaller, as necessary so that the "gaps" in the pixel structure do not all align. Another reason for this approach is to make the design robust against failure: if one switchable mirror stack fails, then the others will still provide some protection. The multiple switchable mirror stacks could be designed to provide a series of wavelength-shifted responses (e.g., wavelengths $\lambda_1$ to $\lambda_3$, wavelengths $\lambda_2$ to $\lambda_4$, wavelengths $\lambda_3$ to $\lambda_5$, etc.). Also, such multiple switchable mirror stacks might be implemented in groups of incident angles—not all the same—so that the center angle is common and gets the most protection, but other angles of incidence get covered as the actual canopy layout requires.

In addition, the switching time for the cholesteric materials is not commutative. In other words, when an electric field is applied on a layer of the material and the helices all "stretch out" (call that a mode 1 change), that stretching out can be much faster than the opposite switching mode. When the helices are already "stretched out" and the field is removed (call that a mode 2 change), the switching time in the opposite direction is driven by thermal motion, which can take a long time. It is possible that a continuous, alternating or pulsed electric field could be applied by a circuit in the mode 2 change in order to speed it up by applying an anti-pulse to the ITO pixels.

In accordance with a further embodiment, the switchable mirror may be implanted in parallel with an internal display on the canopy. A narrow-band reflecting layer can be placed on the inside surface of the canopy in a manner that would not disturb the transmitted color balance and then a narrow-band laser could be used to scan on the inside of the canopy to create a display (for example, symbology representing a runway). This concept can be expanded to encompass three colors to provide a full color display on the inside of the canopy that can overlay colors, boundaries and descriptions with what the pilot is looking at. In the event that the entire protection system is overwhelmed, it could go black on purpose and then the pilot is shown on the inside of the canopy what the external world looks like to the external protected cameras.

Figure 13:
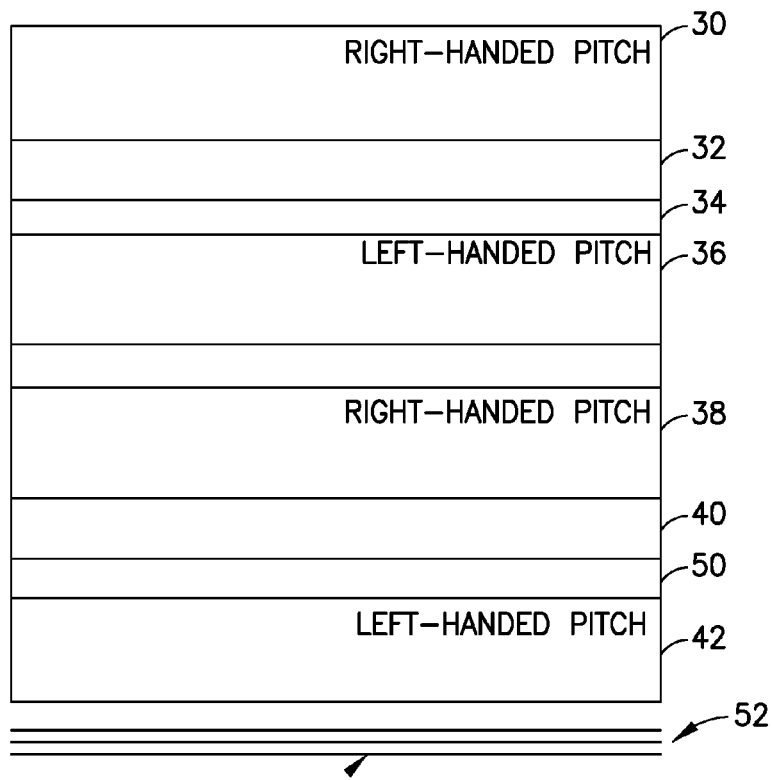
FIG. 13 is a diagram showing an exemplary configuration of a window layer structure having an active display overlying an electrically switchable mirror.

FIG. 13 is a diagram showing an exemplary configuration of a window layer structure having an active display 52 overlying an electrically switchable mirror designed to reflect light in the visible and infrared ranges. The electrically switchable mirror depicted in FIG. 13 (transparent electrodes and anti-reflection coatings are not shown) comprises: (1) a first superlayer stack 30 comprising a first electrically switchable layer of CLC material having a first state in which RHCP visible light incident thereon is reflected and LHCP visible light incident thereon is transmitted and a second state wherein RHCP and LHCP visible light incident thereon are transmitted; (2) a second superlayer stack 36 comprising a second electrically switchable layer of CLC material having a first state in which LHCP visible light incident thereon is reflected and RHCP visible light incident thereon is transmitted and a second state wherein RHCP and LHCP visible light incident thereon are transmitted; (3) an electrically switchable half-wave plate 34 disposed between the superlayer stacks 30 and 36; (4) a first phase compensator 32 disposed between the half-wave plate 34 and the first superlayer stack 30; (5) a third superlayer stack 38 comprising a third electrically switchable layer of CLC material having a first state in which RHCP IR light incident thereon is reflected and LHCP IR light incident thereon is transmitted and a second state wherein RHCP and LHCP IR light incident thereon are transmitted; (6) a fourth superlayer stack 42 comprising a fourth electrically switchable layer of CLC material having a first state in which LHCP IR light incident thereon is reflected and RHCP IR light incident thereon is transmitted and a second state wherein RHCP and LHCP IR light incident thereon are transmitted; (7) an electrically switchable half-wave plate 50 disposed between the third and fourth superlayer stacks 38 and 42; and (8) a second phase compensator 40 disposed between the third superlayer stack 38 and the half-wave plate 50. The active display 52 may comprise one or more layers for displaying respective colors. In the embodiment depicted in FIG. 13, the active display 52 comprises three layers of materials on the inside of the switchable mirror that reflect light having respective narrow and specific wavelengths. The layers of the active display 52 are illuminated with light (indicated by arrow 52) of the same exact wavelengths transmitted by respective very low-power internal scanning lasers (not shown).

Figure 14:
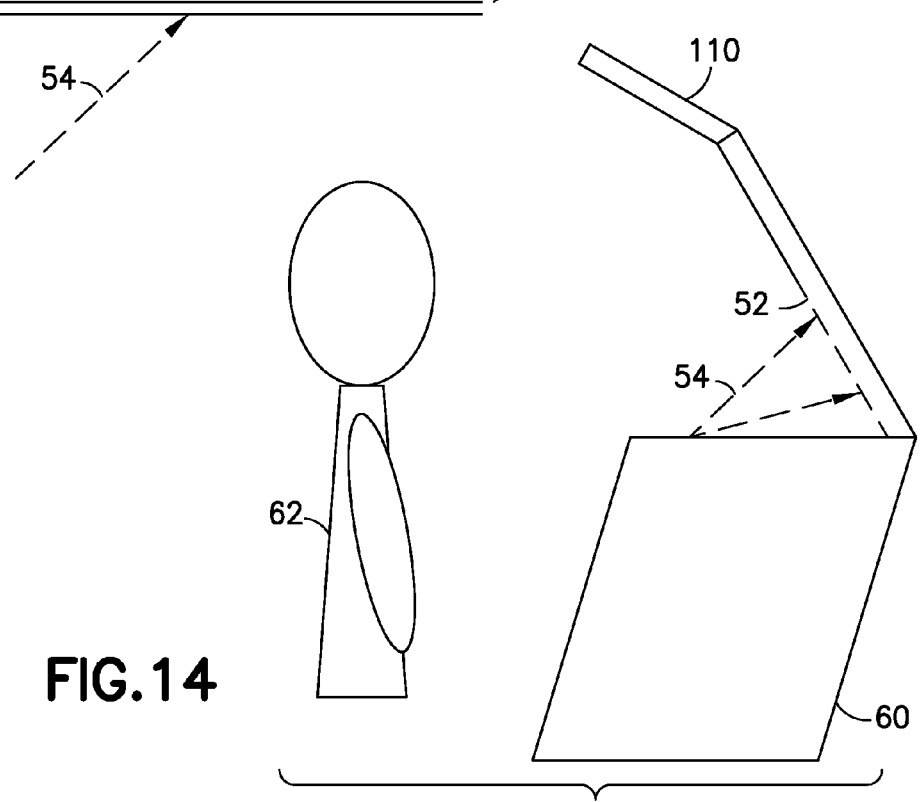
FIG. 14 is a diagram showing a canopy having an integrated display on the interior surface in accordance with some embodiments.

FIG. 14 is a diagram showing a canopy 110 having an integrated active display 52 on the interior surface in accordance with some embodiments. The active display 52 is viewable only from the pilot's side (inside of the cockpit) of the canopy 110. The arrow 54 represents laser light transmitted by scanning lasers installed in the flight console 60. In the event that the canopy 110 is completely darkened, the active display 54 may be activated to provide situational awareness for the pilot 62.

In a single color, the active display 52 could provide: (1) labels and outlines of dimly seen scenery features such as landing strips; (2) sensor-fused identities of potential targets moving as the target apparently moved; and (3) feedback of the directed energy weapon protection. In multiple colors, the active display 52 could further provide: (1) direct red/green target identification; (2) battle management indications for air and ground threats and threat "reaches"; and (3) day-vision appropriate labeling, and a corresponding night-vision appropriate color labeling scheme. The integrated display technology will be incorporated into the window on the bottom half, as seen in FIG. 14. There will be no inherent limit to the area of the canopy panel occupied by the integrated display.

While electro-optical switchable mirror devices have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising at least one processing unit (e.g., a central processing unit, an integrated circuit or an arithmetic logic unit).

The invention claimed is:

1. An electrically switchable mirror comprising:
a first electrically switchable layer of cholesteric liquid crystal material, said first electrically switchable layer having a first state in which right-handed circularly polarized light incident thereon is reflected and left-handed circularly polarized light incident thereon is transmitted and a second state wherein right-handed and left-handed circularly polarized light incident thereon are transmitted;
a second electrically switchable layer of cholesteric liquid crystal material, said second electrically switchable layer having a first state in which left-handed circularly polarized light incident thereon is reflected and right-handed circularly polarized light incident thereon is transmitted and a second state wherein right-handed and left-handed circularly polarized light incident thereon are transmitted; and
a first electrically switchable wave plate disposed between said first and second electrically switchable layers.

2. The electrically switchable mirror as recited in claim 1, further comprising a first phase compensator disposed between said first and second electrically switchable layers.

3. The electrically switchable mirror as recited in claim 1, wherein said first and second electrically switchable layers are effective for light having wavelengths in a range of 425 to 800 nm.

4. The electrically switchable mirror as recited in claim 3, further comprising:
a third electrically switchable layer of cholesteric liquid crystal material, said third electrically switchable layer having a first state in which right-handed circularly polarized light incident thereon is reflected and left-handed circularly polarized light incident thereon is transmitted and a second state wherein right-handed and left-handed circularly polarized light incident thereon are transmitted; and
a fourth electrically switchable layer of cholesteric liquid crystal material, said fourth electrically switchable layer having a first state in which left-handed circularly polarized light incident thereon is reflected and right-handed circularly polarized light incident thereon is transmitted and a second state wherein right-handed and left-handed circularly polarized light incident thereon are transmitted,
wherein said third electrically switchable layer is disposed between said second and fourth electrically switchable layers, and said third and fourth electrically switchable layers are effective for light having wavelengths in a range of 750 to 1,200 nm.

5. The electrically switchable mirror as recited in claim 4, further comprising a second electrically switchable wave plate disposed between said third and fourth electrically switchable layers.

6. The electrically switchable mirror as recited in claim 4, further comprising a second phase compensator disposed between said third and fourth electrically switchable layers.

7. The electrically switchable mirror as recited in claim 4, further comprising:
a fifth electrically switchable layer of cholesteric liquid crystal material, said fifth electrically switchable layer having a first state in which right-handed circularly polarized light incident thereon is reflected and left-handed circularly polarized light incident thereon is transmitted and a second state wherein right-handed and left-handed circularly polarized light incident thereon are transmitted; and
a sixth electrically switchable layer of cholesteric liquid crystal material, said sixth electrically switchable layer having a first state in which left-handed circularly polarized light incident thereon is reflected and right-handed circularly polarized light incident thereon is transmitted and a second state wherein right-handed and left-handed circularly polarized light incident thereon are transmitted, wherein said fifth electrically switchable layer is disposed between said fourth and sixth electrically switchable layers, and said fifth and sixth electrically switchable layers are effective for light having wavelengths in a range of 1,000 to 1,300 nm.

8. An apparatus for protection from bright light sources, comprising an array of pixels, wherein at least one of the pixels of the array comprises:

a first electrically switchable layer of cholesteric liquid crystal material, said first electrically switchable layer having a first state in which right-handed circularly polarized light incident thereon is reflected and left-handed circularly polarized light incident thereon is transmitted and a second state wherein right-handed and left-handed circularly polarized light incident thereon are transmitted;

a second electrically switchable layer of cholesteric liquid crystal material, said second electrically switchable layer having a first state in which left-handed circularly polarized light incident thereon is reflected and right-handed circularly polarized light incident thereon is transmitted and a second state wherein right-handed and left-handed circularly polarized light incident thereon are transmitted; and an electrically switchable wave plate disposed between said first and second electrically switchable layers.

9. The apparatus as recited in claim 8, wherein the at least one pixel further comprises further comprises a first phase compensator disposed between said first and second electrically switchable layers.

10. The apparatus as recited in claim 8, wherein said first and second electrically switchable layers are effective for light having wavelengths in a range of 425 to 800 nm.

11. The apparatus as recited in claim 10, wherein the at least one pixel further comprises:

a third electrically switchable layer of cholesteric liquid crystal material, said third electrically switchable layer having a first state in which right-handed circularly polarized light incident thereon is reflected and left-handed circularly polarized light incident thereon is transmitted and a second state wherein right-handed and left-handed circularly polarized light incident thereon are transmitted; and a fourth electrically switchable layer of cholesteric liquid crystal material, said fourth electrically switchable layer having a first state in which left-handed circularly polarized light incident thereon is reflected and right-handed circularly polarized light incident thereon is transmitted and a second state wherein right-handed and left-handed circularly polarized light incident thereon are transmitted, wherein said third electrically switchable layer is disposed between said second and fourth electrically switchable layers, and said third and fourth electrically switchable layers are effective for light having wavelengths in a range of 750 to 1,200 nm.

12. The apparatus as recited in claim 11, wherein the at least one pixel further comprises a second phase compensator disposed between said third and fourth electrically switchable layers.

13. A sight protection system comprising an optically transparent substrate and an electrically switchable mirror applied on a surface of said optically transparent substrate, wherein said electrically switchable mirror comprises:

a first electrically switchable layer of cholesteric liquid crystal material, said first electrically switchable layer having a first state in which right-handed circularly polarized light incident thereon is reflected and left-handed circularly polarized light incident thereon is transmitted and a second state wherein right-handed and left-handed circularly polarized light incident thereon are transmitted;

a second electrically switchable layer of cholesteric liquid crystal material, said second electrically switchable layer having a first state in which left-handed circularly polarized light incident thereon is reflected and right-handed circularly polarized light incident thereon is transmitted and a second state wherein right-handed and left-handed circularly polarized light incident thereon are transmitted; and an electrically switchable wave plate disposed between said first and second electrically switchable layers.

14. The sight protection system as recited in claim 13, further comprising a first phase compensator disposed between said first and second electrically switchable layers.

15. The sight protection system as recited in claim 13, wherein said first and second electrically switchable layers are effective for light having wavelengths in a range of 425 to 800 nm.

16. The sight protection system as recited in claim 15, wherein said electrically switchable mirror further comprises:

a third electrically switchable layer of cholesteric liquid crystal material, said third electrically switchable layer having a first state in which right-handed circularly polarized light incident thereon is reflected and left-handed circularly polarized light incident thereon is transmitted and a second state wherein right-handed and left-handed circularly polarized light incident thereon are transmitted; and a fourth electrically switchable layer of cholesteric liquid crystal material, said fourth electrically switchable layer having a first state in which left-handed circularly polarized light incident thereon is reflected and right-handed circularly polarized light incident thereon is transmitted and a second state wherein right-handed and left-handed circularly polarized light incident thereon are transmitted, wherein said third electrically switchable layer is disposed between said second and fourth electrically switchable layers, and said third and fourth electrically switchable layers are effective for light having wavelengths in a range of 750 to 1,200 nm.

17. The sight protection system as recited in claim 16, wherein said electrically switchable mirror further comprises a second phase compensator disposed between said third and fourth electrically switchable layers.

18. The sight protection system as recited in claim 16, wherein said electrically switchable mirror further comprises:

a fifth electrically switchable layer of cholesteric liquid crystal material, said fifth electrically switchable layer having a first state in which right-handed circularly polarized light incident thereon is reflected and left-handed circularly polarized light incident thereon is transmitted and a second state wherein right-handed and left-handed circularly polarized light incident thereon are transmitted; and a sixth electrically switchable layer of cholesteric liquid crystal material, said sixth electrically switchable layer having a first state in which left-handed circularly polarized light incident thereon is reflected and right-handed circularly polarized light incident thereon is transmitted and a second state wherein right-handed and left-handed circularly polarized light incident thereon are transmitted, wherein said fifth electrically switchable layer is disposed between said fourth and sixth electrically switchable layers, and said fifth and sixth electrically switchable layers are effective for light having wavelengths in a range of 1,000 to 1,300 nm.

19. The sight protection system as recited in claim 13, wherein said optically transparent substrate is selected from the group consisting of a window, a canopy, and a visor.

20. The sight protection system as recited in claim 13, further comprising an active display applied on a surface of said electrically switchable mirror.

21. An electrically switchable mirror comprising:
a first electrically switchable layer of cholesteric liquid crystal material having a right-handed pitch;
a second electrically switchable layer of cholesteric liquid crystal material having a left-handed pitch;
an electrically switchable wave plate disposed between said first and second electrically switchable layers; and
a phase compensator disposed between said first and second electrically switchable layers,
wherein the electrically switchable mirror is semi-transmissive when said first and second electrically switchable layers and said electrically switchable wave plate are unbiased.

* * * * *